United States Patent Office 2,731,478
Patented Jan. 17, 1956

2,731,478

PROCESS FOR THE MANUFACTURE OF BENZOQUINONE

Jonas Kamlet, Easton, Conn.

No Drawing. Application August 14, 1953,
Serial No. 374,429

11 Claims. (Cl. 260—396)

This invention relates to a process for the manufacture of p-benzoquinone. More particularly it relates to a novel process for effecting the oxidation of aniline to p-benzoquinone with a quadrivalent manganese compound in acid solution, wherein the oxidizing agent is regenerated by the use of cheap and readily available reagents and returned to the process. It has for its purpose to provide a process for the oxidation of aniline to p-benzoquinone which does not yield large amounts of difficultly disposable manganous sulfate by-product but rather permits the recycling of the oxidizing agent after a simple process of regeneration. Further purposes of this invention will become obvious in the course of my description thereof.

It has long been the industrial practice to prepare p-benzoquinone by the oxidation of aniline in sulfuric acid solution with a source of manganese dioxide of high purity (e. g. pyrolusite). Large amounts of manganous sulfate are obtained as by-products. This high grade pyrolusite must as a rule be imported from abroad and is often unavailable. When available, it is often diverted to more strategic uses. The manganous sulfate by-product is obtained in amounts far in excess of usual requirements in agriculture, animal feed supplements, paint driers, chemicals manufacture, etc. Considerable amounts of this by-product remain annually as unused surplus and represents a considerable economic loss.

The oxidation of aniline with manganese dioxide and sulfuric acid to obtain p-benzoquinone, is described in B10S Final Reports 773 and 1627; PB Reports 532, 4115 and 58804; Carus, U. S. Patent 2,144,424 (1939), Gibbs, U. S. Patent 2,343,768 (1944), Von Bramer & Zabriskie, U. S. Patent 1,998,177 (1935), Von Bramer & Ruggles, U. S. Patent 2,043,912 (1936).

The reaction involved in this oxidation is:

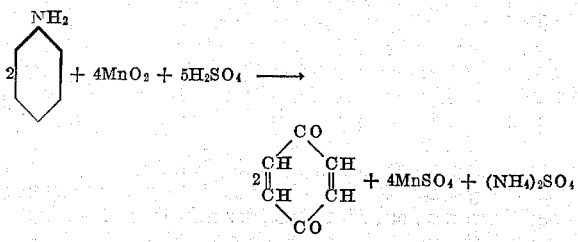

The basis of my invention is the finding that the oxidation of aniline to p-benzoquinone with manganese dioxide and sulfuric acid may be effected with equal ease and with equal or superior yields by the use of Weldon mud in sulfuric acid solution as an oxidizing agent.

Weldon mud is a dark brown to black slurry or suspension obtained by the controlled oxidation of a manganous chloride solution in the presence of a stoichiometric excess of lime, at temperatures above 40° C., with air as an oxidizing agent. It contains (on a dry solids basis) a major amount of manganese dioxide and minor amounts of manganous oxide and calcium oxide. These oxides are hydrated and may exist as loose coordination compounds or as manganites (such as CaO.MnO₂, CaO.2MnO₂, etc.). A typical analysis of Weldon mud indicates the presence (on a dry solids basis) of 61.3 mole-percent of MnO₂, 16.2 mole-percent of MnO and 22.5 mole-percent of CaO in the slurry. Weldon mud is produced as an intermediate in the Weldon Process (for the oxidation of hydrochloric acid to chlorine) and will be more fully explained below.

The process of this invention involves three interrelated steps and may best be understood by the description of each step seriatim. These steps are referred to as (A) the organic oxidation step, (B) the ion-interchange step, and (C) the oxidant regeneration step.

(A) THE ORGANIC OXIDATION STEP

The oxidation of the aniline is effected in exactly the same manner with the Weldon mud as if manganese dioxide were being used. The Weldon mud particles are in a fine state of subdivision and are largely hydrated. They are therefore considerably more reactive than the manganese dioxide present in pyrolusite or in other ores.

It has long been noted that ores containing lower amounts of MnO₂ must be used in stoichiometrically larger amounts to obtain equivalent yields. Thus, in the oxidation of aniline to p-benzoquinone, a pyrolusite ore assaying 65% MnO₂ must be used to the extent of 130% of theory to obtain a yield which can be obtained using a pyrolusite ore assaying 80% MnO₂ to the extent of 120% of theory. This yield, however, can also be obtained using Weldon mud containing (on a dry solids basis) only 68% MnO₂ to the extent of 120% of theory. This is due to the markedly higher activity of the quadrivalent manganese in the Weldon mud.

In using Weldon mud as an oxidation agent, it is necessary to use a quantity of sulfuric acid sufficient to react with the CaO to form CaSO₄, sufficient to react with the MnO to form MnSO₄ and sufficient to provide the acid medium required for the oxidation. In most present oxidations with MnO₂, it is customary to employ a stoichiometric excess of sulfuric acid. Because of the higher reactivity of the quadrivalent manganese in the Weldon mud, it becomes feasible to diminish the amount of excess sulfuric acid used and thus largely to compensate for the acid used to neutralize the CaO and MnO in the Weldon mud.

Thus, in the oxidation of aniline to p-benzoquinone with MnO₂ and H₂SO₄, theory requires the use of 2.5 moles H₂SO₄ per mole MnO₂. In commercial practice, using 85% pyrolusite, 4.53 moles H₂SO₄ are used per mole MnO₂. In the process of this invention, I find that it suffices to use 4.81 moles H₂SO₄ per mole of quadrivalent manganese in the form of Weldon mud.

After the conclusion of the oxidation, the end-product of the oxidation is removed as a non-aqueous phase, i. e.

(a) By steam distilling the p-benzoquinone, preferably with superheated steam, from the oxidation liquors, (b) By filtration (i. e. by cooling the oxidation liquors, allowing the quinone to crystallize and by filtering off the crystalline precipitate) or (c) By extracting the p-benzoquinone from the aqueous mother liquors with a water immiscible solvent in which the quinone is soluble (such as ether, petroleum ether). Steam distillation is by far the preferred method for the recovery of the p-benzoquinone from the oxidation liquors.

The p-benzoquinone thus obtained may then be purified by any of the processes well known in the art. As a rule however, it is obtained in a state of sufficiently high purity to be used further in any organic synthesis or for any industrial end use.

If the presence of small amounts of chloride ion in the Weldon mud is undesirable (i. e. if the benzoquinone or any product to be made therefrom must be free of traces of combined chlorine), the Weldon mud may be freed of said chloride ion by adding it to the sulfuric acid required in the oxidation step so as to obtain an acid reaction mixture, and thereafter passing a current of air or an inert gas through the agitated mixture until the effluent gas gives a negative o-tolidine test for chlorine. The acid reacts with the chloride to yield HCl which is then oxidized by the $MnO_2$ to $Cl_2$, which is then swept from the reaction mass by the gas stream. The chloride-free reaction mixture of Weldon mud and sulfuric acid is then used for the oxidation in the usual manner.

After the removal and recovery of the benzoquinone end-product of the oxidation, the aqueous mother liquor residue of the oxidation is then passed on the second step of the process.

(B) THE ION-INTERCHANGE STEP

The aqueous solution residual from the first step of the process is now treated further. Such a solution may be free of other materials but will usually contain free sulfuric acid and may also contain some ammonium sulfate (if derived during the oxidation of the aniline in the above-mentioned p-benzoquinone synthesis). Any such primary solution may be used directly in any desired $MnSO_4$ concentration without further treatment.

In the practice of the second step of the process, the primary solution is treated, at room temperature or above, in any convenient reaction vessel of suitable construction, with (a) a quantity of aqueous calcium chloride solution substantially stoichiometrically equivalent to the quantity of manganous sulfate (and, if present, ammonium sulfate) in the primary solution. In the usual event where free sulfuric acid is present in the primary solution, the solution is also treated with (b) an aqueous slurry of milk of lime (calcium hydroxide) substantially stoichiometrically equivalent to the total quantity of free sulfuric acid present. The milk of lime slurry may be of any convenient concentration and may be added to the primary solution before, after or simultaneously with the addition of the calcium chloride solution. The concentration of the calcium chloride solution may vary over a wide range, e. g., 5% to 50%. Since an excess of the by-product $CaCl_2$ solution is obtained in the third step of this process, as will be explained hereinbelow, a portion of this by-product solution may be used in this first step of the process.

The reactions which here occur are:

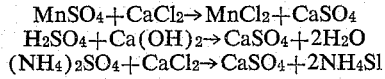

There is thus obtained an aqueous solution of manganous chloride (which may contain ammonium chloride) free of other heavy-metal chlorides, and a precipitate of calcium sulfate which carries down with it, as a closely adsorbed coprecipitate all organic impurities in the solution. If the original $MnSO_4$ is derived from an organic chemical oxidation (such as aniline to p-benzoquinone), the organic residue of this oxidation is carried down with the calcium sulfate precipitate.

Any ammonium sulfate present in the primary solution is converted to ammonium chloride, and remains in solution with the manganous chloride.

The $MnCl_2$ solution is now separated from the precipitate by any convenient means, such as filtration, centrifuging, sedimentation and decantation, etc. The precipitate, largely or entirely calcium sulfate, may be discarded or used elsewhere outside of the process.

(C) THE OXIDANT REGENERATION STEP

The regeneration of the Weldon mud from the $MnCl_2$ solution obtained in the second step is substantially identical to the oxidizing step of the old and well known Weldon Process, which was extensively operated throughout the world during the latter half of the nineteenth and early part of the twentieth century. An excellent description of the equipment, procedure and operating conditions of the Weldon Process may be found in the text by G. Lunge, Sulfuric Acid and Alkali, first edition, volume III, chapter VI, pages 198–237 inclusive.

The Weldon Process (Chemical News 20, 109 (1869), ibid., 41, 129, 179, 181 (1881), ibid. 42, 10, 19 (1881)) is based on the fact that freshly precipitated manganous hydroxide, suspended in a solution of calcium chloride (such as is obtained by reacting $MnCl_2$ with milk of lime), in the presence of an excess of lime, can be oxidized by a current of air or oxygen forced through the liquid, until some 79%–80% of the bivalent manganese is oxidized to the tetravalent form.

The presence of a substantial excess of lime is essential and represents a vital aspect of the Weldon Process. It has been postulated that this excess of lime combines with at least a portion of the tetravalent manganese compounds formed by the oxidation to form calcium manganites which have been assigned formulae such as $CaO.MnO_2$, $CaO.2MnO_2$, $CaH_2(MnO_3)_2$, etc. It is not at all certain that such calcium manganites exist in fact. These may be true compounds, or co-ordination complexes, or loosely bound addition products or mere intimate physical mixtures of hydrated manganese dioxide and calcium oxide. These calcium manganites react chemically in every sense identically with intimate physical mixtures of $MnO_2$ and $CaO$ and may, for the purposes of the present invention, be considered the substantial equivalent thereof.

The optimum operation of the Weldon process has been described by Lunge, cited above. The optimum proportions of reagents are given in terms of molar equivalents, for purposes of clarity and ease of explanation. However, this is in no way intended to limit the size of any given oxidation batch to the indicated molar quantities. The process may be operated equally as satisfactorily with batches of $MnCl_2$ solution of any size, using the same preferred relative proportion of reagents throughout. The equipment for effecting this oxidation is also described in detail by Lunge.

In the preferred operation of the Weldon process, the $MnCl_2$ solution is treated, in two stages, with a 30%–40% stoichiometric excess of aqueous milk of lime slurry (preferably containing 300 to 335 grams CaO and preferably less than 10 grams MgO per liter). Air is blown through the resultant slurry preferably at 8–10 lb. pressure and preferably after the reaction mixture has been warmed to 55°–60° C. by steam, but the oxidation may be effected under other conditions such as at room temperature. The preferred two-stage operation involves first treating a portion of the $MnCl_2$ solution with all of the lime slurry, oxidizing under the conditions indicated for 2½ to 4 hours or until there is no further increase in the $MnO_2$ titer of the solution; then adding the remainder of the $MnCl_2$ solution and continuing the oxidation (i. e., aeration) under the same conditions, i. e., at 55°–60° C., for a further 1½–2 hours or until there is no further increase of the $MnO_2$ titer of the solution. At this point, from 79% to 80% of the manganese ion will be in the tetravalent form, which represents the maximum degree of oxidation obtainable by the Weldon process.

The $MnCl_2$ solution, when mixed with the milk of lime, yields a light yellow slurry. Air (or any other oxygen-containing gas) may be forced through the solution through a convenient sparger, diffuser plate, aeration cone, etc. in a finely-diveded stream. As the oxidation proceeds, the slurry rapidly turns brown and then black, as the manganese dioxide and/or calcium manganites form.

The preferred relative proportions of reagents employed in the first stage of the preferred two-stage operation of the Weldon process consist in the use with 100 moles of $MnCl_2$ solution of 160 moles of milk of lime, when oxidizing in the preferred manner at 55°–60° C. for 2½–4 hours. The empirical equation for this stage of the operation is:

$$100MnCl_2 + 160CaO + 43O_2 \rightarrow 86MnO_2 + 14MnO + 60CaO + 100CaCl_2$$

The second stage involves charging the oxidation vessel with a further preferred portion of 24 moles of $MnCl_2$ solution, and continuing the oxidation of 55°–60° C. for 1½ hours. The empirical equation for this second stage of the operation is:

$$86MnO_2 + 14MnO + 60CaO + 100CaCl_2 + 24MnCl_2 + 6O_2 \rightarrow 98MnO_2 + 26MnO + 36CaO + 124CaCl_2$$

At the conclusion of the oxidation, therefore, 79%–80% of the manganese is present as the tetravalent form, partly as $MnO_2$ and partly as calcium manganites or mixtures of $MnO_2$ and CaO. Similarly, 20%–21% of the manganese is present in the divalent form, probably as manganous hydroxide which is largely soluble in the excess of $CaCl_2$ solution.

The over-all empirical equation for the Weldon process may therefore be given as:

$$124MnCl_2 + 160CaO + 49O_2 \rightarrow 98MnO_2 + 26MnO + 36CaO + 124CaCl_2$$

All of the reagents are used in the proportions indicated by this empirical equation, except for the oxygen. A large excess of air is blown through the reaction mixture, containing far more oxygen than is required by the above equation. In practice, from 135 to 160 cubic feet of air at normal pressure is required to form one pound of $MnO_2$ from the equivalent amount of $MnCl_2$ solution. This is about 13 to 15 times the theoretical amount.

It is understood, of course, that the operation of the process of the present invention is in no way dependent on the exact duplication or adherence to the optimum conditions for operating the Weldon process. Obvious modifications may be made by those skilled in the art. Thus, the mode and order of addition of the reagents may be changed, the aeration may be effected at a higher or a lower temperature than that indicated, the oxidation may be effected with oxygen or oxygen-containing gas or any similar changes and improvements may be made in the Weldon process, as applied to the second step of the process of the present invention without departing from the spirit and purpose of the latter.

When the $MnCl_2$ solution used in this step contains some ammonium chloride (the source of which is indicated in the first step), the process is modified preferably only to the extent that an additional quantity of milk of lime is added equivalent to the ammonium chloride content, i. e., the total amount of milk of lime used is 160 moles per 124 moles of $MgCl_2$ plus 0.5 mole per 1.0 mole $NH_4Cl$. This excess of lime reacts with the $NH_4Cl$ according to the equation:

$$2NH_4Cl + Ca(OH)_2 \rightarrow CaCl_2 + 2NH_3 + 2H_2O$$

The ammonia formed is completely volatilized and removed from the reaction mixture by the current of air being forced through during the oxidation. This current of air may be washed through a sulfuric acid solution, if desired, to recover the ammonia content thereof as a commercially valuable by-product of this process. After the oxidant regeneration step the reaction mixture, in the oxidation vessel, preferably comprises per 124 moles of original $MnCl_2$ solution:

98 moles $MnO_2$
26 moles MnO
36 moles CaO
124 moles $CaCl_2$ plus any $CaCl_2$ formed from $NH_4Cl$ The Weldon mud, thus formed, is filtered from the calcium chloride solution, washed with hot water on the filter press and then returned to the first step of the process for use in oxidizing the next batch. The filter cake may be slurred with a little water and now corresponds in composition to the Weldon mud used in the first step of the process.

About 1% to 3% of the oxidant is lost mechanically per cycle and may be "made-up" by the addition of small amounts of pyrolusite or other source of $MnO_2$ to the first step of the process, or of small amounts of $MnSO_4$ to the second step of the process.

The filtrate from this step may be evaporated or concentrated in any advisable manner to recover the calcium chloride solution used in the Ion Interchange Step of this process.

Analytical procedures for assaying the MnO, $MnO_2$, CaO and $CaCl_2$ content of the various reagents and reaction mixtures of the process of the present invention are given by Lunge (cited above) on pp. 230–233 of Sulfuric Acid and Alkali, volume III (London, 1880).

The following example is given to illustrate the present invention in greater detail, but in no way to limit it to the precise reactants, proportions or conditions described therein. Modifications and variations will occur to any person skilled in the art.

*Example*

In a lead lined vessel there is mixed 5600 liters of ice water, 500 kgs. of aniline (5.3 moles) and 1400 kgs. of 60° Bé. sulfuric acid (11.2 moles). In another homogeneously lead lined oxidation vessel fitted with cooling coils for refrigeration, with brine or ammonia, and with an efficient agitator, there is charged 1785 kgs. of 60° Bé. sulfuric acid (14.3 moles), 1000 kgs. of ice water and half of the total amount of Weldon mud to be used for the oxidation (a total of 1617 kgs. of Weldon mud (dry weight basis)—containing 12.75 moles $MnO_2$, 3.38 moles MnO and 4.68 moles CaO, is used for the oxidation).

The reaction mixture in the oxidizing vessel is agitated and cooled to a temperature of 3° C.–5° C. The addition of the aniline sulfate solution is now started. The aniline sulfate solution is added in portions, alternately with portions of the other half of the Weldon mud. The reaction mixture is well agitated and maintained by efficient cooling at a temperature between 5° and 10° C. After all of the reagents have been added (10–12 hours), the agitation is continued until all of the manganese is in solution as $MnSO_4$.

The oxidation liquor is now steam distilled with steam at 10–20 atmospheres. The volatile p-benzoquinone is driven off and recovered in the cooled steam condensate. The crystallizing liquor is filtered by suction at a temperature under 20° C. The yield of p-benzoquinone, yellow monoclinic prisms, M. P. 115°–116° C., is 510 kgs., equivalent to 89% of the theoretical.

The aqueous mother liquors remaining after the steam distillation now contain 16.13 moles $MnSO_4$ (12.75 moles from the reduction of the $MnO_2$, 3.38 moles from the acidification of the MnO in the Weldon mud), 4.68 moles $CaSO_4$ (from the acidification of the CaO), 2.65 moles ammonium sulfate (from the aniline oxidation) and 2.00 moles of excess sulfuric acid. To this mother liquor is now added 113.0 kgs. of lime (2 moles) as a slurry containing 330 gms. CaO per liter, and 2085 kgs. of calcium chloride (18.78 moles $CaCl_2$) as a 20% aqueous solution. The precipitated calcium sulfate is filtered off and washed with a little hot water. The filtrate and washings are combined, and will now contain 16.13 moles of $MnCl_2$ and 5.30 moles of $NH_4Cl$. This solution is used to regenerate the Weldon mud.

Four-fifths of this solution is mixed at once with 1244 kgs. of lime (22.17 moles) as a slurry containing 330 gms. CaO per liter, heated by steam to 55°–60° C., aerated for 2½ to 4 hours until no further increase in $MnO_2$ titer occurs after 15 minutes of consecutive aeration. The remaining one-fifth of the solution is then added, and the aeration continued for 1½ to 2 hours until a total of 79%–80% of the total manganese is present in the tetravalent state. By scrubbing the effluent gases of this aeration through sulfuric acid, 80–82 kgs. of ammonia may be recovered as ammonium sulfate.

The precipitate of Weldon mud is then filtered, and the filter cake is washed with hot water. The combined filtrate and washings are then concentrated to a 20% solids concentration, thereby regenerating the 2085 kgs. of calcium chloride (as 20% soln.) which is used in the second step of the process.

The filter cake of Weldon mud (after addition of 40 kgs. of 85% $MnO_2$ pyrolusite per cycle to make up for mechanical losses) will contain 1617 kgs. (dry solids basis) of a mixture equivalent to 12.75 moles of $MnO_2$, 3.38 moles MnO and 4.68 moles CaO. This is slurried with a little water and recycled for use as an oxidant in the first step of the process.

A raw materials balance of this process, exclusive of air and water is:

500 kgs. aniline
3185 kgs. 60° Bé. $H_2SO_4$
1357 kgs. lime
40 kgs. 85% $MnO_2$ pyrolusite (make-up for losses) yield
510 kgs. p-benzoquinone
81 kgs. ammonia
3455 kgs. calcium sulfate (anhydrous basis).

This process is equally applicable to the oxidation of ortho-toluidine to toluquinone. (Clark, American Chemical Journal 14, 565 (1892); Nietzke, Annalen 215, 458 (1882); Schnitzer, Benchte 20, 2283 (1887). By substituting 570 kgs. of o-toluidine for the aniline in the above example, a yield of 549.0 kgs. of toluquinone, yellow platelets, M. Pt. 67°–68° C. is obtained, equivalent to 85% of the theoretical.

Having described my invention, what I claim and desire to protect by Letters Patent is:

1. A process for the manufacture of p-benzoquinone which comprises the steps of: (a) oxidizing aniline in an aqueous sulfuric acid medium with Weldon mud, and separating the p-benzoquinone thus formed from the residual aqueous solution of manganous sulfate, (b) reacting the manganous sulfate solution with a substantially equimolecular amount of calcium chloride and separating the resultant precipitate of calcium sulfate from the resultant solution of manganous chloride, and (c) reacting the manganous chloride solution with an equimolecular amount of lime in the presence of substantial excess of lime and passing an oxygen-containing gas through the resultant suspension of manganous hydroxide and excess lime in calcium chloride solution whereby the major portion of the divalent manganese is oxidized to the tetravalent state, separating the resultant Weldon mud containing the equivalents of a major amount of $MnO_2$ and minor amounts of MnO and CaO from the solution of calcium chloride, and returning the said Weldon mud to the first step of the process.

2. A process as defined in claim 1 further characterized in that the aqueous manganous sulfate solution also contains free sulfuric acid which is neutralized in step (b) with a substantially equimolecular amount of lime.

3. A process as defined in claim 1 further characterized in that the aqueous manganous sulfate solution also contains ammonium sulfate which is reacted in step (b) with a substantially equimolecular amount of calcium chloride to form additional calcium sulfate which is precipitated and ammonium chloride which is converted in step (c) into additional calcium chloride and ammonia, the latter of which is volatilized and removed from the reaction mixture.

4. A process as defined in claim 1 further characterized in that the stoichiometric excess of lime used in step (c) is in the range of 30% to 40%.

5. A process as defined in claim 1 further characterized in that step (c) is carried out in two stages the first consisting in reacting a portion of the manganous chloride solution from step (b) with all of the lime and passing an oxygen-containing gas through the resultant suspension of manganous hydroxide and excess lime in calcium chloride solution and the second consisting in adding the remainder of the manganous chloride solution from step (b) to the resulting oxidation mixture and continuing the passing of oxygen-containing gas through the resultant suspension.

6. A process as defined in claim 5 further characterized in that the oxygen-containing gas used in step (c) is air; and in that the suspension through which air is passed in step (c) is warmed to about 55–60° C. by steam.

7. A process as defined in claim 1 wherein the oxidizing agent is Weldon mud comprising a suspension or slurry containing the equivalent, on a dry weight basis, of a major portion of manganese dioxide and minor portions of manganous oxide and calcium oxide.

8. A process as defined in claim 1 wherein the mixture of Weldon mud and aqueous sulfuric acid is freed of residual chloride ion content by blowing with an inert gas prior to the addition of the aniline.

9. A process as defined in claim 1 wherein the p-benzoquinone is separated from the oxidation product by steam distillation.

10. A process as defined in claim 1 applied to the oxidation of ortho-toluidine to toluquinone.

11. A process as defined in claim 1 wherein the calcium chloride filtrate from step (c) is concentrated and returned to step (b) of the process.

References Cited in the file of this patent

UNITED STATES PATENTS

| | | |
|---|---|---|
| 2,144,424 | Carius | Jan. 17, 1939 |
| 2,343,768 | Gibbs | Mar. 9, 1944 |
| 2,614,030 | Kamlet | Oct. 14, 1952 |